(12) United States Patent
Geerlings et al.

(10) Patent No.: US 7,731,921 B2
(45) Date of Patent: Jun. 8, 2010

(54) PROCESS FOR SEQUESTRATION OF CARBON DIOXIDE

(75) Inventors: Jacobus Johannes Cornelis Geerlings, Amsterdam (NL); Gerardus Antonius Franciscus Van Mossel, Amsterdam (NL); Bernardus Cornelis Maria In' T Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/097,945

(22) PCT Filed: Dec. 18, 2006

(86) PCT No.: PCT/EP2006/069796
§ 371 (c)(1), (2), (4) Date: Jun. 18, 2008

(87) PCT Pub. No.: WO2007/071633
PCT Pub. Date: Jun. 28, 2007

(65) Prior Publication Data
US 2009/0010827 A1 Jan. 8, 2009

(30) Foreign Application Priority Data
Dec. 20, 2005 (EP) .................. 05112531

(51) Int. Cl.
*C01F 11/18* (2006.01)
(52) U.S. Cl. .................. 423/155; 423/165; 423/430; 423/432; 423/640
(58) Field of Classification Search .................. 423/155, 423/164, 165, 186, 189, 210, 220, 224, 225, 423/231, 232, 230, 324, 325, 326, 331, 414, 423/415.1, 419.1, 421, 422, 427, 430, 432, 423/437.1, 438, 579, 583, 592.1, 594.1, 594.2, 423/594.16, 635, 636, 637, 640
See application file for complete search history.

(56) References Cited

U.S. PATENT DOCUMENTS

| 5,792,440 | A | * | 8/1998 | Huege | .................. 423/432 |
|---|---|---|---|---|---|
| 6,843,843 | B2 | | 1/2005 | Takahashi et al. | .................. 106/682 |
| 7,060,127 | B2 | * | 6/2006 | Tanabe et al. | .................. 106/465 |
| 7,550,127 | B2 | | 6/2009 | Takahashi et al. | .................. 423/432 |
| 2001/0054253 | A1 | | 12/2001 | Takahashi et al. | .................. 47/63 |
| 2003/0029590 | A1 | | 2/2003 | Tanabe et al. | .................. 162/158 |
| 2004/0228788 | A1 | | 11/2004 | Nagai et al. | .................. 423/432 |
| 2005/0036932 | A1 | | 2/2005 | Takahashi et al. | .................. 423/432 |
| 2005/0235872 | A1 | | 10/2005 | Tanabe et al. | .................. 106/463 |
| 2007/0154380 | A1 | * | 7/2007 | Takahashi et al. | .................. 423/432 |

FOREIGN PATENT DOCUMENTS

| DE | 19622292 | 12/1996 |
|---|---|---|
| WO | WO9711030 | 3/1997 |
| WO | WO0025899 | 5/2000 |
| WO | WO0164585 | 9/2001 |
| WO | WO02085788 | 10/2002 |

OTHER PUBLICATIONS

"Carbon dioxide sequestration by mineral carbonation". ECN Literature Review, Feb. 2003, pp. 1-52, XP002263407.3, Alkaline solid wastes. 5.2 Aqueous scheme. 8.4 Alkaline solid wastes Annex A.
International Search Report dated Mar. 7, 2007, (PCT/EP2006/069796).
Richard P. Walters et al., "Mineral Carbonation: A Viable Method for CO2 Sequestration", 1999, Internet site: http://web.archive.org/web/20010224101527/http://www.netl.doe.gov/products/gcc/indepth/mineral/mincarb.html.

* cited by examiner

*Primary Examiner*—Wayne Langel
*Assistant Examiner*—Syed Iqbal
(74) *Attorney, Agent, or Firm*—Charles W. Stewart

(57) ABSTRACT

A process for sequestration of carbon dioxide comprising the following steps: (a) dispersing solid waste material comprising calcium oxide and a calcium-comprising mixed oxide in water to dissolve at least part of the calcium oxide and to form calcium oxide-depleted solid waste material in a calcium hydroxide solution; (b) separating the calcium hydroxide solution from the calcium oxide-depleted solid waste material; (c) converting the calcium hydroxide in the separated calcium hydroxide solution in precipitated calcium carbonate; and (d) contacting an aqueous slurry of the calcium oxide-depleted solid waste material with carbon dioxide for mineral carbonation of the carbon dioxide to form carbonated solid waste material.

23 Claims, No Drawings

PROCESS FOR SEQUESTRATION OF CARBON DIOXIDE

The present application claims priority from European Patent Application 05112531.8 filed 20 Dec. 2005.

FIELD OF THE INVENTION

The present invention provides a process for sequestration of carbon dioxide by mineral carbonation of a solid waste material comprising calcium oxide and a calcium-comprising mixed oxide, in particular steel slag.

BACKGROUND OF THE INVENTION

It is known that carbon dioxide may be sequestered by mineral carbonation. In nature, stable carbonate minerals and silica are formed by a reaction of carbon dioxide with natural silicate minerals:

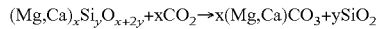

$$(Mg,Ca)_xSi_yO_{x+2y}+xCO_2 \rightarrow x(Mg,Ca)CO_3+ySiO_2$$

The reaction in nature, however, proceeds at very low reaction rates. The feasibility of such a reaction in process plants has been studied. These studies mainly aim at increasing the reaction rate.

At the internet site of the US department of energy, http://www.fetc.doe.gov/publications/factsheets/program/prog006.pdf, for example, is disclosed the reaction of finely ground serpentine $(Mg_3Si_2O_5(OH)_4)$ or olivine $(Mg_2SiO_4)$ in a solution of supercritical carbon dioxide and water to form magnesium carbonate.

In WO02/085788 is disclosed a process for mineral carbonation wherein particles of silicates selected from the group of ortho-, di-, ring, and chain silicates, are dispersed in an aqueous electrolyte solution and reacted with carbon dioxide.

An alternative for the use of natural minerals as starting material for carbon dioxide sequestration is the use of industrial waste materials that contain calcium-comprising mixed oxides such as calcium silicate or calcium iron oxide. Mineral carbonation of industrial waste materials such as steel slag has been proposed. In 'Accelerated carbonation of waste calcium silicate materials' by D. C. Johnson (ISSN 1353-114X), for example, it is disclosed that stainless steel slag, deinking ash, pulverised fuel ash are suitable feedstocks for a carbon dioxide sequestration process.

The use of steel slag for mineral carbonation would, however, be more attractive if valuable product streams could be recovered from the carbonation process.

SUMMARY OF THE INVENTION

Some types of steel slag contain a considerable amount of calcium oxide (CaO). It has now been found that such steel slag, or other solid waste materials that contain both calcium oxide and a calcium-comprising mixed oxide, may be used for carbon dioxide sequestration whilst recovering pure calcium carbonate from the process. Calcium carbonate is a valuable product that finds application as filler material, whitening agent or polymer additive in the paper, paint or chemical industry.

Accordingly, the present invention provides a process for sequestration of carbon dioxide comprising the following steps:
(a) dispersing solid waste material comprising calcium oxide and a calcium-comprising mixed oxide in water to dissolve at least part of the calcium oxide and to form calcium oxide-depleted solid waste material in a calcium hydroxide solution;
(b) separating the calcium hydroxide solution from the calcium oxide-depleted solid waste material;
(c) converting the calcium hydroxide in the separated calcium hydroxide solution in precipitated calcium carbonate; and
(d) contacting an aqueous slurry of the calcium oxide-depleted solid waste material with carbon dioxide for mineral carbonation of the carbon dioxide to form carbonated solid waste material.

DETAILED DESCRIPTION OF THE INVENTION

In the carbon dioxide sequestration process according to the invention, a solid waste material comprising calcium oxide and a calcium-containing mixed oxide is first dispersed in water in order to dissolve at least part of the calcium oxide (step (a)). Preferably at least 50 wt % of the calcium oxide in the solid waste material is dissolved, more preferably at least 80 wt %. Calcium oxide dissolution step (a) will be typically carried out at ambient conditions, i.e. at room temperature and at atmospheric pressure. Calcium oxide will dissolve as calcium hydroxide. Thus, a calcium oxide-depleted solid waste material in a calcium hydroxide solution is formed.

In step (b) of the process according to the invention, the calcium hydroxide solution is separated from the calcium oxide-depleted solid waste material, for example by filtration or by sedimentation. The separated calcium hydroxide solution is now used for the preparation of calcium carbonate (step (c)) and the calcium oxide-depleted solid waste material is used for mineral carbonation of carbon dioxide (step (d)).

The conversion of calcium hydroxide from a solution into precipitated calcium carbonate is well-known in the art. Step (c) may be carried out in any suitable way known in the art, for example by reacting the calcium hydroxide solution with a carbon dioxide containing gas. The carbon dioxide containing gas will typically be a flue gas. A concentrated carbon dioxide stream or pure carbon dioxide may also be used as carbon dioxide containing gas.

In mineral carbonation step (d), an aqueous slurry of the calcium oxide-depleted solid waste material is contacted with carbon dioxide to convert the calcium-comprising mixed oxide in the solid material into calcium carbonate. The aqueous slurry suitably contains up to 60 wt % of solid material, based on the total weight of the aqueous slurry, preferably 10 to 50 wt %. The aqueous slurry may, for example, be formed by mixing feedstock particles, preferably particles with an average diameter in the range of from 0.5 µm to 5 cm, with an aqueous stream, preferably water.

The slurry is typically contacted with gaseous carbon dioxide. In order to achieve a high reaction rate, it is preferred that the carbon dioxide concentration in step (d) is high, which can be achieved by applying an elevated carbon dioxide pressure. Suitable carbon dioxide pressures are in the range of from 0.05 to 100 bar (absolute), preferably in the range of from 0.1 to 10 bar (absolute). The total process pressure may be in the range of from 1 to 150 bar (absolute), preferably of from 1 to 40 bar (absolute), more preferably of from 1 to 10 bar (absolute). Reference herein to carbon dioxide pressure is to the pressure at conditions of Standard Temperature and Pressure (STP), i.e. at 0° C. and 1 atm.

The slurry may be contacted with a gaseous stream of pure or concentrated carbon dioxide or with a stream comprising a low concentration of carbon dioxide such as an industrial off-gas or flue gas.

In mineral carbonation step (d), the solid waste material is carbonated, i.e. the calcium-comprising mixed oxide in the solid waste material is converted into calcium carbonate. In the case of calcium silicate as mixed oxide, calcium silicate is converted into calcium carbonate and silica. The carbonation reaction may be suitably carried out at a temperature in the range of from 0 to 200° C., preferably of from 0 to 100° C., more preferably of from 10 to 60° C.

If the contacting with carbon dioxide is continued for a sufficient period of time, part of the calcium carbonate formed is further converted into calcium bicarbonate and dissolves in the liquid phase:

$$CaCO_3 + CO_2 + H_2O \rightarrow Ca(HCO_3)_2$$

Such continued contacting with carbon dioxide is suitably carried out at a temperature below 60° C., preferably at ambient temperature. An aqueous solution of calcium bicarbonate is thus formed. The dissolved calcium bicarbonate can be easily separated from the solid material and then further converted into precipitated calcium carbonate.

Therefore, in the process according to the invention the contacting of carbon dioxide with CaO-depleted solid waste material in step (d) is preferably carried out for a time period sufficient to form an aqueous solution of calcium bicarbonate and the process preferably further comprises:

(e) separating part or all of the aqueous solution of calcium bicarbonate from the carbonated solid waste material;
(f) precipitating calcium carbonate from the separated aqueous solution of calcium bicarbonate; and
(g) recovering the precipitated calcium carbonate as product.

Separation step (e) may be carried out in any way known in the art, for example by filtration or sedimentation.

Precipitation step (f) may suitably be carried out by removing carbon dioxide from the separated aqueous solution of calcium bicarbonate or by adding a precipitant, for example calcium hydroxide, to the calcium bicarbonate solution.

Removal of carbon dioxide from an aqueous solution of calcium bicarbonate will shift the equilibrium between calcium bicarbonate and calcium carbonate to the right:

$$Ca(HCO_3)_2 \leftrightarrow CaCO_3 + CO_2 + H_2O$$

Since the solubility of calcium carbonate is very low, calcium carbonate will precipitate upon carbon dioxide removal.

The carbon dioxide may be removed by any suitable method. Such methods are known in the art and include release of carbon dioxide overpressure, heating the solution, stripping with an inert gas such as nitrogen or air, applying a vacuum, or ultrasound treatment of the calcium bicarbonate solution. A combination of these methods for removing carbon dioxide, simultaneously or sequentially, may be used to increase the carbonate yield.

Preferably, all or part of the carbon dioxide removed is recycled to mineral carbonation step (d) or to precipitation step (c).

Instead of removing carbon dioxide from the calcium bicarbonate solution, a precipitant may be added to the solution in order to precipitate calcium carbonate. Calcium hydroxide is known to be a suitable precipitant for this purpose. In a preferred embodiment of the process according to the invention, calcium hydroxide from the calcium hydroxide solution obtained in step (b) is added to the calcium bicarbonate solution. The calcium hydroxide solution as such may be added. Alternatively, concentrated calcium hydroxide from that solution is added.

In step (g) of the process according to the invention, the precipitated calcium carbonate is recovered as product from the suspension of precipitated calcium carbonate that is formed in step (f). The precipitated calcium carbonate may be recovered from this suspension in any suitable way, for example by separating the suspension into substantially pure solid carbonate and an aqueous stream in a separator.

The feedstock for the process according to the invention is a solid waste material comprising calcium oxide and a calcium-comprising mixed oxide. Reference herein to calcium-comprising mixed oxide is to an oxide compound comprising at least two metals or metalloid components, at least one of them being calcium. Examples of suitable non-calcium metals or metalloid components are iron or silicon. The mixed oxide may be in its hydrated form. Preferably, the feedstock comprises at least one mixed oxide selected from calcium silicate, calcium iron oxide, calcium iron silicate, calcium silicate hydroxide, or calcium iron silicate hydroxide. More preferably the feedstock comprises calcium silicate.

Any solid waste material comprising calcium oxide and a calcium-comprising mixed oxide may be used. Preferably, the feedstock is an alkaline solid waste material. Preferably, the feedstock comprises at least 5 wt % of calcium oxide, more preferably at least 10 wt %, and at least 5 wt % of calcium-comprising mixed oxide, more preferably at least 10 wt %. Examples of such feedstocks are steel slag, paper bottom ash, or coal fly ash. Steel slag is a preferred feedstock. Steel slag typically comprises calcium silicate or calcium iron oxide, usually in a concentration in the range of from 15 to 30 wt %. Some types of steel slag also comprise a significant amount of calcium oxide, typically 10 wt % or more. Such steel slag is a particularly suitable feedstock for the process according to the invention.

EXAMPLES

The process according to the invention will now be further illustrated by means of the following non-limiting examples.

Example 1

Twenty grams of paper bottom ash with a composition as shown in Table 1 (as determined by XRD analysis) was dispersed in 900 ml of demineralised water. The dispersion was stirred for 15 minutes and had a pH of 12.2. After 15 minutes, the solid material was separated from the dispersion. A calcium hydroxide solution with a calcium concentration of 1.1 grams per liter was obtained. Pure carbon dioxide was led through the calcium hydroxide solution at a rate of 25 ml/min. Precipitated calcium carbonate was formed and removed from the solution by filtration. TGA analysis of the precipitated calcium carbonate showed that substantially pure calcium carbonate was formed.

The leached solid waste material was three further times dispersed in water to leach substantially all calcium oxide from it. The composition of the leached paper bottom ash (after four treatments) was determined by XRD analysis and is shown in Table 1.

The leached paper bottom ash still contains 10 wt % of calcium silicate and can thus suitably be used for mineral carbonation (step (d) of the process according to the invention).

TABLE 1

Composition of feedstock paper bottom ash and leached paper bottom ash.

| Component | feedstock paper bottom ash (wt %) | leached paper bottom ash (wt %) |
|---|---|---|
| $Ca_2(Mg_{0.25}Al_{0.75})(Si_{1.25}Al_{0.75}O_7)$ | 35 | 42 |
| $CaCO_3$ | 21 | 27 |
| $Ca_2(SiO_4)$ | 16 | 10 |
| CaO | 11 | 0 |
| $CaAl_2Si_2O_8$ | 8 | 7 |
| $SiO_2$ | 7 | 6 |
| $Fe_{0.5}Mg_{0.5}Ti_2O_5$ | 1 | 1 |
| $Ca_3Al_2(SiO_4)_2Cl_4$ | 1 | 1 |
| Other | — | 5 |

Example 2

Ten grams of steel slag with a composition as shown in Table 2 (as determined by XRD analysis) was dispersed in 900 ml of demineralised water. The dispersion was stirred for 15 minutes and had a pH of 12.4. After 15 minutes, the solid material was separated from the dispersion. A calcium hydroxide solution with a calcium concentration of 0.46 grams per liter was obtained. Pure carbon dioxide was led through the calcium hydroxide solution at a rate of 25 ml/min. Precipitated calcium carbonate was formed and removed from the solution by filtration. TGA analysis of the precipitated calcium carbonate showed that substantially pure calcium carbonate was formed.

TABLE 2

Composition of feedstock steel slag

| component | feedstock steel slag (wt %) |
|---|---|
| $Ca(OH)_2$ | 38 |
| $Ca_2(Fe,Mg,Si)_2O_5$ | 27 |
| $CaCO_3$ | 12 |
| $SiO_2$ | 8 |
| CaO | 6 |
| $Fe_3O_4$ | 4 |
| $(FeO)_{0.9}(MnO)_{0.1}$ | 3 |
| $CaMg(CO_3)_2$ | 2 |

The presence of calcium hydroxide and calcium carbonate in the feedstock steel slag indicates that part of the calcium oxide that was originally present has been converted due to contact with moisture and carbon dioxide from the air.

What is claimed is:

1. A process for sequestration of carbon dioxide comprising the following steps:
   (a) dispersing solid waste material comprising calcium oxide and a calcium-comprising mixed oxide in water to dissolve at least part of the calcium oxide and to form calcium oxide-depleted solid waste material in a calcium hydroxide solution;
   (b) separating the calcium hydroxide solution from the calcium oxide-depleted solid waste material;
   (c) converting the calcium hydroxide in the separated calcium hydroxide solution into precipitated calcium carbonate;
   (d) contacting an aqueous slurry comprising water and from 10 to 50 wt % of the calcium oxide-depleted solid waste material with carbon dioxide to form an aqueous solution of calcium bicarbonate for mineral carbonation of the carbon dioxide to form carbonated solid waste material;
   (e) separating part or all of the aqueous solution of calcium bicarbonate from the carbonated solid waste material;
   (f) precipitating calcium carbonate from the separated aqueous solution of calcium bicarbonate; and
   (g) recovering the precipitated calcium carbonate as product;
   in which process the calcium carbonate is precipitated from the separated aqueous solution of calcium bicarbonate in step (f):
   (i) by adding calcium hydroxide from the solution obtained in step (b) to the separated aqueous solution of calcium bicarbonate; and/or
   (ii) by removal of carbon dioxide from the solution of calcium bicarbonate and wherein the carbon dioxide removed in step (f) is added to the calcium hydroxide solution in step (c).

2. A process according to claim 1, wherein the calcium-comprising mixed oxide is calcium silicate, calcium iron oxide or calcium iron silicate.

3. A process according to claim 2, wherein the solid waste material is steel slag.

4. A process according to claim 1, wherein step (d) is carried out at a temperature in the range of from 0 to 200° C.

5. A process according to claim 1, wherein the operating pressure during step (d) is in the range of from 1 to 150 bar (absolute).

6. A process according to claim 1, wherein in step (d) the calcium oxide-depleted solid waste material is contacted with a carbon dioxide-containing industrial off-gas.

7. A process according to claim 1, wherein the calcium-comprising mixed oxide is calcium silicate.

8. A process according to claim 1, wherein step (d) is carried out at a temperature in the range of from 0 to 100° C.

9. A process according to claim 1, wherein step (d) is carried out at a temperature in the range of from 10 to 60° C.

10. A process according to claim 1, wherein the operating pressure during step (d) is in the range of from 1 to 40 bar (absolute).

11. A process according to claim 1, wherein the operating pressure during step (d) is in the range of from 1 to 10 bar (absolute).

12. A process according to claim 1, wherein in step (d) the calcium oxide-depleted solid waste material is contacted with a carbon dioxide-containing industrial flue gas.

13. A process according to claim 2, wherein step (d) is carried out at a temperature in the range of from 0 to 200° C.

14. A process according to claim 3, wherein step (d) is carried out at a temperature in the range of from 0 to 200° C.

15. A process according to claim 2, wherein the operating pressure during step (d) is in the range of from 1 to 150 bar (absolute).

16. A process according to claim 3, wherein the operating pressure during step (d) is in the range of from 1 to 150 bar (absolute).

17. A process according to claim 1, wherein the solid waste material is paper bottom ash.

18. A process according to claim 2, wherein in step (d) the calcium oxide-depleted solid waste material is contacted with a carbon dioxide-containing industrial off-gas.

19. A process according to claim 3, wherein in step (d) the calcium oxide-depleted solid waste material is contacted with a carbon dioxide-containing industrial off-gas.

20. A process according to claim 4, wherein in step (d) the calcium oxide-depleted solid waste material is contacted with a carbon dioxide-containing industrial off-gas.

21. A process according to claim 5, wherein in step (d) the calcium oxide-depleted solid waste material is contacted with a carbon dioxide-containing industrial off-gas.

22. A process according to claim 1, wherein at least 50 wt % of the calcium oxide in the solid waste material is dissolved in step (a).

23. A process according to claim 1, wherein at least 80 wt % of the calcium oxide in the solid waste material is dissolved in step (a).

* * * * *